(12) United States Patent
Cyman, Jr. et al.

(10) Patent No.: US 10,445,692 B2
(45) Date of Patent: Oct. 15, 2019

(54) MONITORING DEVICE AND METHOD OF OPERATING A MONITORING DEVICE TO TRANSMIT DATA

(71) Applicant: CRYOVAC, LLC, Charlotte, NC (US)

(72) Inventors: Theodore F. Cyman, Jr., Grand Island, NY (US); Eric V. Palmer, Lancaster, NY (US); Ali K. Cameron, Clarence, NY (US); Dave Renzo, III, Buffalo, NY (US); Alan R. Murzynowski, Grand Island, NY (US); Daniel E. Kanfoush, Grand Island, NY (US)

(73) Assignee: Cryovac, LLC, Charlotte, NC (US)

( * ) Notice: Subject to any disclaimer, the term of this patent is extended or adjusted under 35 U.S.C. 154(b) by 227 days.

(21) Appl. No.: 15/451,036

(22) Filed: Mar. 6, 2017

(65) Prior Publication Data

US 2018/0252554 A1 Sep. 6, 2018

(51) Int. Cl.
*G06Q 10/08* (2012.01)
*H04B 10/50* (2013.01)
*H04B 10/114* (2013.01)

(52) U.S. Cl.
CPC ....... *G06Q 10/087* (2013.01); *H04B 10/1141* (2013.01); *H04B 10/502* (2013.01)

(58) Field of Classification Search
CPC .......... G01N 7/00; G01N 21/00; G01N 31/00; G01N 33/00; G06Q 10/087; G06Q 10/08; H04B 10/502; H04B 10/1141; G06K 19/07; G06K 19/0716
See application file for complete search history.

(56) References Cited

U.S. PATENT DOCUMENTS

| 4,012,552 A | 3/1977 | Watts |
| 4,368,281 A | 1/1983 | Brummett et al. |
| 4,515,653 A | 5/1985 | Furubayashi et al. |

(Continued)

FOREIGN PATENT DOCUMENTS

| EP | 1019715 | 1/2005 |
| FR | 2 997 218 A1 | 4/2014 |

(Continued)

OTHER PUBLICATIONS

U.S. Appl. No. 14/996,413, R.R. Donnelley & Sons Company.

(Continued)

*Primary Examiner* — Que Tan Le
*Assistant Examiner* — Jennifer D Bennett
(74) *Attorney, Agent, or Firm* — McCracken & Gillen LLC

(57) ABSTRACT

A monitoring device and a method of operating the monitoring device are disclosed. The monitoring device includes a first substrate adapted to be secured to a structure, a second substrate, and a third substrate disposed between the first and the second substrates. The monitoring device further includes an electronic circuit affixed to the third substrate, wherein the electronic circuit comprises at least one light emitting device and a processor, and the at least one light emitting device is positioned such that light emitted thereby is directed outwardly through the second substrate. The processor selects a plurality binary values to transmit, and in response, to operates the at least one light emitting device in one of an on state and off state in accordance with each binary value.

26 Claims, 11 Drawing Sheets

(56) References Cited

U.S. PATENT DOCUMENTS

| | | | |
|---|---|---|---|
| 4,632,879 | A | 12/1986 | Tanaka et al. |
| 5,581,065 | A | 12/1996 | Nishikawa et al. |
| 5,790,020 | A | 8/1998 | Sasagawa et al. |
| 5,802,015 | A | 9/1998 | Rothschild et al. |
| 6,019,865 | A | 2/2000 | Palmer et al. |
| 6,043,745 | A | 3/2000 | Lake |
| 6,420,096 | B1 | 7/2002 | Löbl et al. |
| 6,421,013 | B1 | 7/2002 | Chung |
| 6,544,864 | B2 | 4/2003 | Reeder et al. |
| 6,853,087 | B2 | 2/2005 | Neuhaus et al. |
| 6,886,745 | B2 | 5/2005 | Berrube et al. |
| 6,888,509 | B2 | 5/2005 | Atherton |
| 6,924,781 | B1 | 8/2005 | Gelbman |
| 7,042,357 | B2 | 5/2006 | Girvin et al. |
| 7,057,495 | B2 | 6/2006 | Debord et al. |
| 7,168,626 | B2 | 1/2007 | Lerch et al. |
| 7,174,277 | B2 | 2/2007 | Vock et al. |
| 7,204,425 | B2 | 4/2007 | Mosher, Jr. et al. |
| 7,248,147 | B2 | 7/2007 | Debord et al. |
| 7,283,054 | B2 | 10/2007 | Girvin et al. |
| 7,295,115 | B2 | 11/2007 | Aljadeff et al. |
| 7,316,358 | B2 | 1/2008 | Kotik et al. |
| 7,323,360 | B2 | 1/2008 | Gonzalez et al. |
| 7,377,447 | B2 | 5/2008 | Oberle |
| 7,417,541 | B2 | 8/2008 | Lerch et al. |
| 7,586,412 | B2 | 9/2009 | Takatama |
| 7,627,451 | B2 | 12/2009 | Vock et al. |
| 7,639,135 | B2 | 12/2009 | Arms et al. |
| 7,675,424 | B2 * | 3/2010 | Debord ................. G01K 3/005 340/309.16 |
| 7,737,839 | B1 | 6/2010 | Jones |
| 7,802,222 | B2 | 9/2010 | Arsintescu |
| 7,856,339 | B2 | 12/2010 | Vock et al. |
| 7,895,739 | B2 | 3/2011 | Niklas et al. |
| 7,945,320 | B2 | 5/2011 | Durand |
| 7,993,055 | B2 | 8/2011 | Nurse et al. |
| 8,126,675 | B2 | 2/2012 | Vock et al. |
| 8,203,446 | B2 | 6/2012 | Tsubota et al. |
| 8,219,466 | B2 | 7/2012 | Gui et al. |
| 8,280,682 | B2 | 10/2012 | Vock et al. |
| 8,317,084 | B2 | 11/2012 | Bagai |
| 8,354,927 | B2 | 1/2013 | Breed |
| 8,428,904 | B2 | 4/2013 | Vock et al. |
| 8,590,799 | B2 | 11/2013 | Liu |
| 8,618,914 | B2 | 12/2013 | Bachman et al. |
| 8,640,259 | B2 | 1/2014 | Jung et al. |
| 8,762,212 | B2 | 6/2014 | Falls et al. |
| 8,870,083 | B2 | 10/2014 | Myers et al. |
| 8,914,090 | B2 * | 12/2014 | Jain .................... A61B 5/0017 600/309 |
| 9,030,724 | B2 | 5/2015 | Agrawal et al. |
| 9,047,437 | B2 | 6/2015 | Chen et al. |
| 9,077,183 | B2 | 7/2015 | Thomas et al. |
| 9,087,318 | B1 | 7/2015 | Cordes et al. |
| 9,495,498 | B2 | 11/2016 | Bartley et al. |
| 9,514,432 | B2 | 12/2016 | Cyman, Jr. et al. |
| 2004/0066296 | A1 | 4/2004 | Atherton |
| 2006/0062108 | A1* | 3/2006 | Muthu ..................... G01J 1/32 369/44.34 |
| 2010/0176950 | A1 | 7/2010 | Bartholf et al. |
| 2011/0131854 | A1 | 6/2011 | Waltersdorf |
| 2012/0038461 | A1 | 2/2012 | Forster |
| 2012/0071742 | A1* | 3/2012 | Medina ............... A61B 5/14552 600/344 |
| 2012/0162945 | A1 | 6/2012 | Schreiner |
| 2012/0274470 | A1* | 11/2012 | Sandvick ................. G08B 5/36 340/584 |
| 2014/0196847 | A1 | 7/2014 | Bergherm |
| 2015/0079697 | A1 | 3/2015 | Belbruno et al. |
| 2015/0269518 | A1* | 9/2015 | Gray ..................... G06Q 10/08 705/332 |
| 2016/0050762 | A1 | 2/2016 | Cyman, Jr. et al. |
| 2016/0148899 | A1 | 5/2016 | Ichimura |
| 2016/0249840 | A1 | 9/2016 | Pesantez et al. |
| 2016/0352423 | A1* | 12/2016 | Tay .................... H04B 10/1141 |
| 2017/0053235 | A1 | 2/2017 | Cyman, Jr. et al. |
| 2017/0076642 | A1 | 3/2017 | Cyman, Jr. et al. |
| 2017/0138922 | A1 | 5/2017 | Potyrailo et al. |
| 2017/0191953 | A1 | 7/2017 | Rigas |
| 2017/0229000 | A1* | 8/2017 | Law .................... G06Q 10/087 |
| 2017/0354372 | A1 | 12/2017 | Varadan et al. |

FOREIGN PATENT DOCUMENTS

| | | |
|---|---|---|
| JP | 2003-277653 | 10/2003 |
| JP | 2011-151259 | 8/2011 |
| WO | WO 00/73082 | 12/2000 |
| WO | WO 03/006736 | 1/2003 |
| WO | WO 2015/160830 | 10/2005 |
| WO | WO 2014/067578 | 5/2014 |
| WO | WO 2015/004830 | 1/2015 |

OTHER PUBLICATIONS

U.S. Appl. No. 15/043,885, R.R. Donnelley & Sons Company.
U.S. Appl. No. 15/398,510, R.R. Donnelley & Sons Company.
Non-Final Office Action dated Dec. 2, 2016, for U.S. Appl. No. 15/043,885, Applicant, R.R. Donnelley & Sons Company (8 pages).
International Search Report and Written Opinion dated Nov. 25, 2015, for International Application No. PCT/US2015/045922, Applicant R.R. Donnelley & Sons Company (11 pages).
Non-final Office action dated Oct. 12, 2016, for U.S. Appl. No. 14/853,563, Applicant, R.R. Donnelley & Sons Company (9 pages).
International Search Report and Written Opinion dated Oct. 8, 2015, for International Application No. PCT/US2015/045089, Applicant, R.R. Donnelley & Sons Company (10 pages).
International Search Report and Written Opinion dated Oct. 20, 2015, for International Application No. PCT/US2015/045128, Applicant, R.R. Donnelley & Sons Company (10 pages).
International Search Report and Written Opinion dated Apr. 6, 2017, for International Application No. PCT/US2017/013464, Applicant, R.R. Donnelley & Sons Company (14 pages).
Duck, A., Dispensing SMD Adhesives: Rotary Pump Technology vs. Stencil Printing Technology, Electronic Packaging and Production, Aug. 1, 1996, pp. 41-44, vol. 36, No. 9, Cahners Publishing Co, Newton Massachusetts, U.S. (4 pages).
Non-Final Office action dated Jun. 8, 2017, for U.S. Appl. No. 14/825,986, Applicant, R.R. Donnelley & Sons Company (9 pages).
International Search Report and Written Opinion dated Apr. 12, 2017, for International Application No. PCT/US2017/012178, Applicant, R.R. Donnelley & Sons Company (18 pages).
Final Office action dated Oct. 25, 2017, for U.S. Appl. No. 14/825,986, Applicant, R.R. Donnelley & Sons Company (7 pages).
International Search Report and Written Opinion dated Aug. 23, 2018, for International Application No. PCT/US2018/035403, Applicant, R.R. Donnelley & Sons Company (15 pages).

* cited by examiner

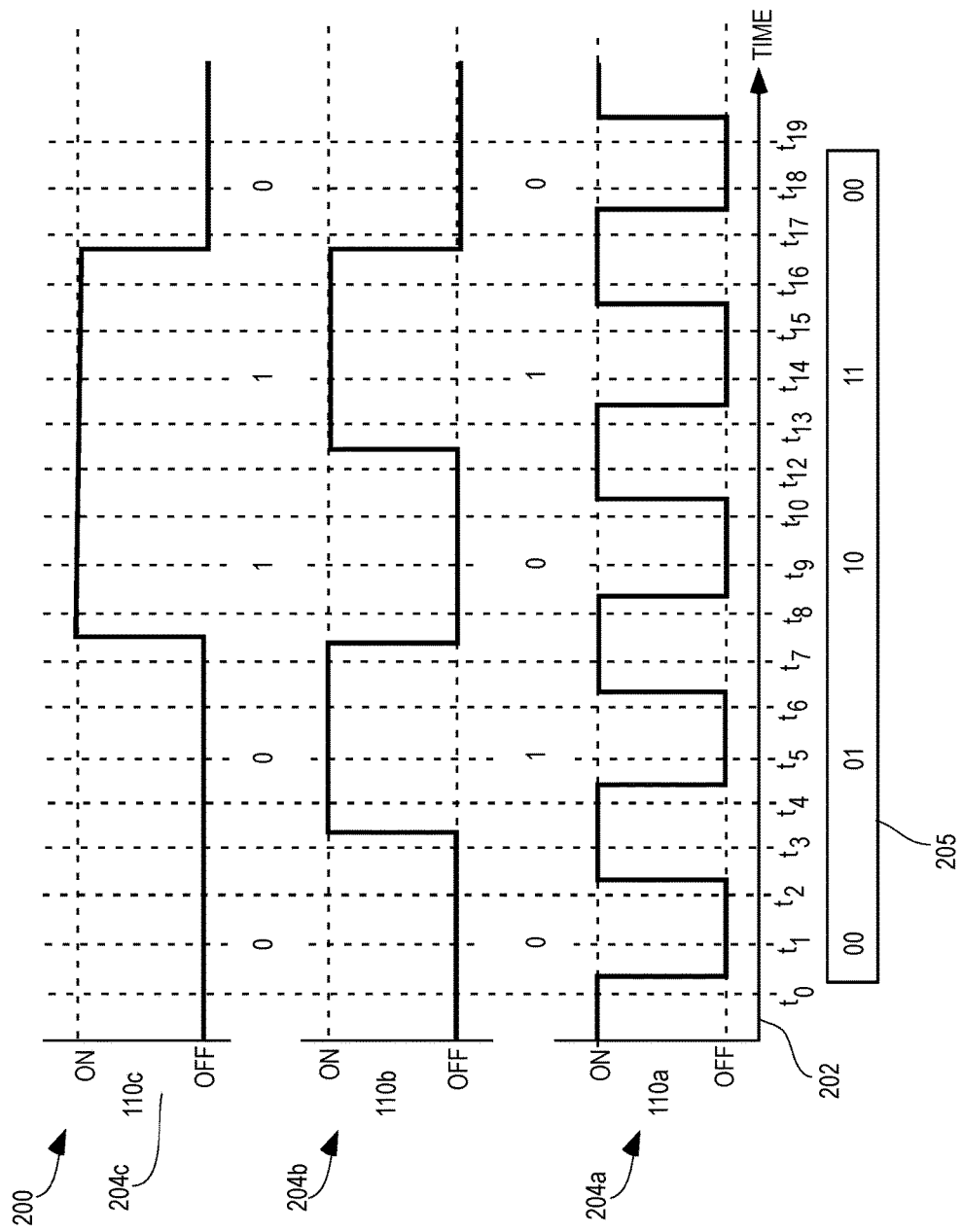

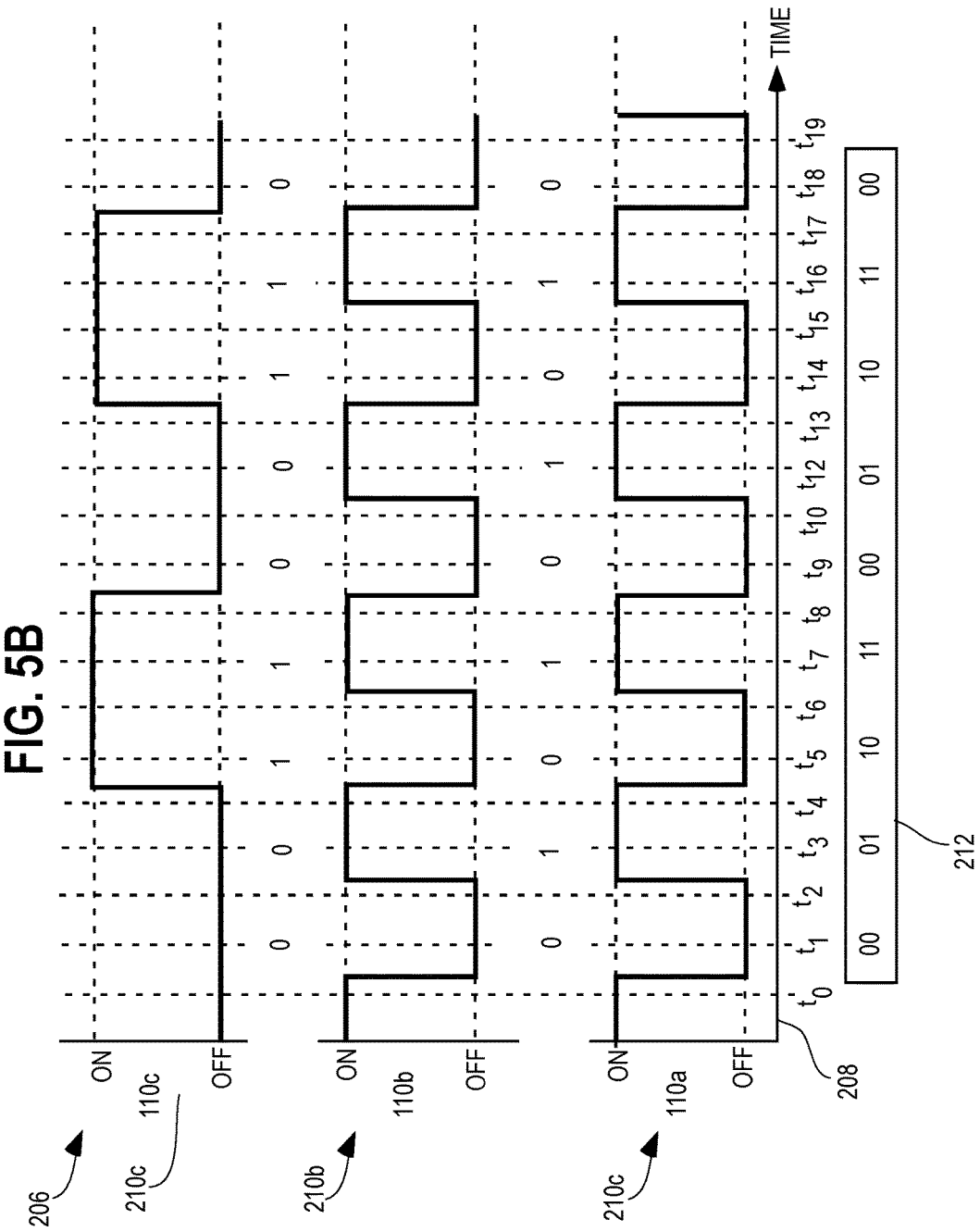

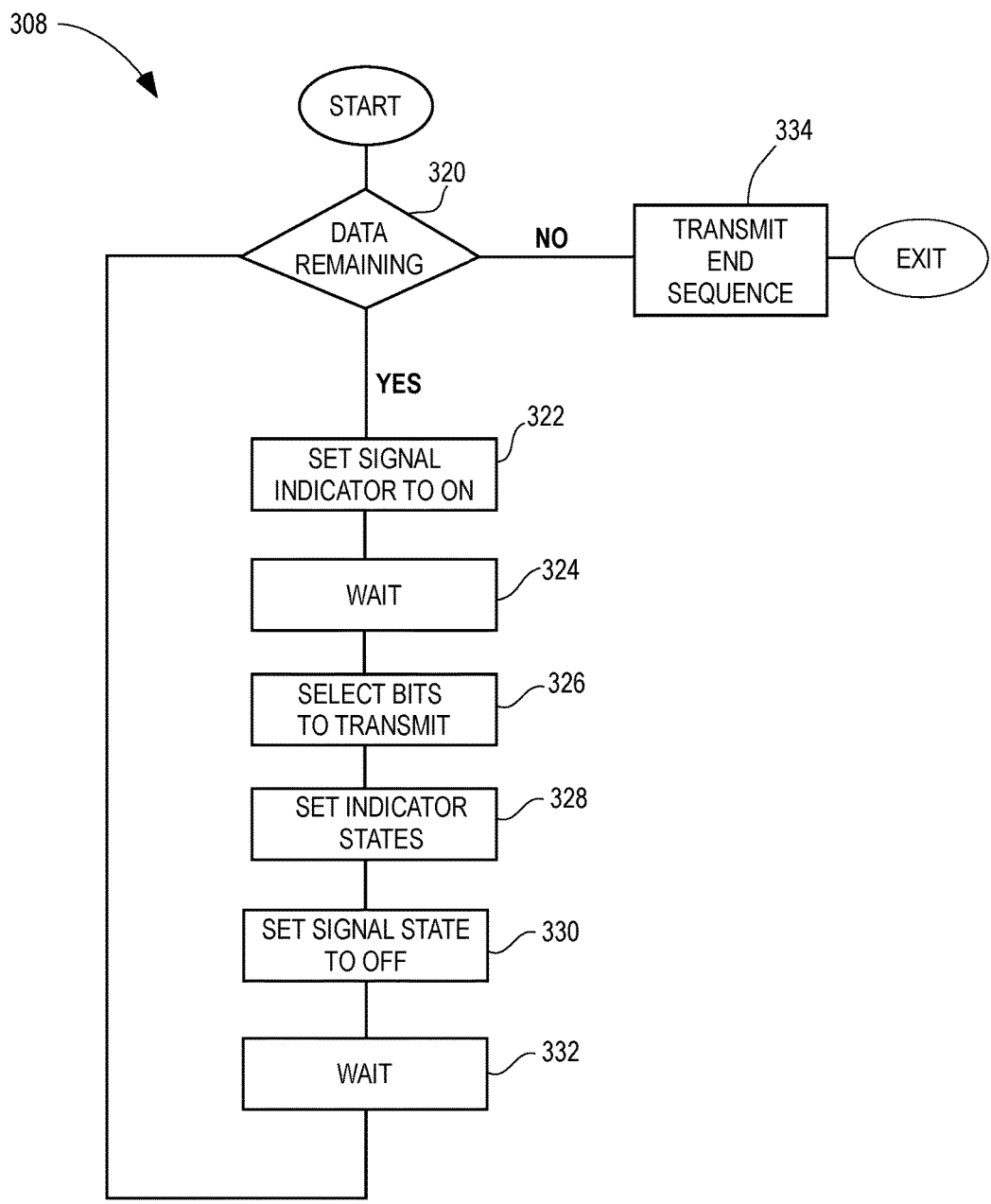

MONITORING DEVICE AND METHOD OF OPERATING A MONITORING DEVICE TO TRANSMIT DATA

FIELD OF DISCLOSURE

The present subject matter relates to a monitoring device and a method of operating the monitoring device to transmit data, and more particularly, to a monitoring device that uses light-based communications to transmit data.

BACKGROUND

An object may be exposed to one or more ambient environmental conditions that can damage or otherwise adversely affect the object. A party, such as an owner or other having an interest in the object, may wish to determine whether the object was so exposed. Some goods may be particularly susceptible to damage from external forces or environmental extremes. For example, glassware, electronic instruments, mechanical parts, and the like may be damaged if dropped or subjected to excessive acceleration. Similarly, electronics, liquids, and pharmaceuticals may be harmed if exposed to temperatures and/or humidity outside of predetermined ranges.

Further, damage to a good may not be apparent simply by inspecting the good. Exposure to forces or extremes in temperature may not cause visually perceptible changes, but may affect the operating characteristics, effectiveness, and/or longevity of the good. For example, the effectiveness of a pharmaceutical or an electronic component may be altered if exposed to extreme temperatures. Similarly, electronic boards in a device may become unseated from connectors if such device is subjected to excessive acceleration, as may occur from being dropped or jostled.

In addition, when a customer reports to a seller that the good was already damaged upon receipt by the customer, it may be difficult to ascertain when such damage occurred, and who is accountable for such damage. In particular, it may be difficult to confirm whether the damage to the good occurred when the good was in storage before sale, while the good was in transit, or after the recipient received the good.

Monitoring devices have been developed that can monitor the environmental conditions to which the good is exposed during storage and/or shipment. Typical monitoring devices include a processor, memory, and one or more sensors. Such a device may include an accelerometer to measure any forces acting on the device, an environmental sensor that measures, for example, the temperature and/or humidity in the environment surrounding the device, a chemical sensor to detect the presence of certain chemicals, and the like. Such a device may be affixed to a package to be shipped, and a processor in the device periodically polls the one or more sensors to acquire therefrom measurements associated with forces acting on the package and/or the environmental conditions. The processor then records such measurements and a timestamp of when such measurement was acquired in the memory, creating a log that can later be analyzed to determine if the good was subjected to extraordinary forces and/or environmental conditions.

In some cases, the monitoring device may include a Radio Frequency Identification Device (RFID) transceiver. To transmit the measurements and timestamps recorded in the memory of such monitoring device to a computer or another device for further analysis, the processor transfers such data from the memory to a buffer memory associated with the RFID transceiver and directs the RFID transceiver to transmit the data from the buffer memory. An RFID reading device receives such data and provides the data to the user. Such data may be analyzed to determine if the package encountered extraordinary forces and/or environmental conditions. The capacity of the buffer memory of an RFID transceiver may be substantially less than the amount of data to be transmitted. If a large amount of data must be transferred, the processor must divide such data into segments, and repeatedly fill the buffer memory with data associated with a segment and direct the RFID transceiver to send the data in the buffer. Repeatedly filling and sending segments in this manner decreases the overall communications rate of the RFID transceiver.

Other types of communications technologies such as WiFi or Bluetooth may be used that efficiently transfer large amounts of data. However, such technologies typically require expensive components and/or a battery with sufficient capacity, which may add to the bulk and/or cost of the monitoring device, and thus may not be commercially feasible.

SUMMARY

According to one aspect, a monitoring device includes a first substrate adapted to be secured to a structure, a second substrate, and a third substrate disposed between the first and the second substrates. The monitoring device further includes an electronic circuit affixed to the third substrate, wherein the electronic circuit comprises at least one light emitting device and a processor, and the at least one light emitting device is positioned such that light emitted thereby is directed outwardly through the second substrate. The processor is adapted to select a plurality of binary values to transmit, and in response, to operate the at least one light emitting device in one of an on state and off state in accordance with each binary value.

According to another aspect, a method of operating a monitoring device that includes an electronic circuit affixed to a substrate, wherein the electronic circuit comprises at least one light emitting device and a processor, includes the steps of selecting a plurality of binary values to transmit, and operating the at least one light emitting device in one of an on state and an off state in accordance with each binary value.

Other aspects and advantages will become apparent upon consideration of the following detailed description and the attached drawings wherein like numerals designate like structures throughout the specification.

BRIEF DESCRIPTION OF THE DRAWINGS

FIGS. 5A and 5B are timing diagrams to illustrate operation of the monitoring device of FIG. 1;

FIG. 7 is a flowchart of processing undertaken by a processor of the monitoring device of FIG. 1 to transmit data;

DETAILED DESCRIPTION

A monitoring device as disclosed herein monitors the environment in which an object is disposed at least at a particular point in time, and more preferably, over a period of time. The monitoring device includes a processor, memory, one or more sensor(s), one or more actuator(s), and one or more indicator(s) such as one or more light emitting device(s) such as light emitting diodes (LEDs). The one or more sensor(s) can measure, for example, the presence of airborne pollutants and/or odors, the temperature and/or the humidity in the ambient environment surrounding the device, the acceleration to which the monitoring device is subjected, and the like. Such a device may be affixed or placed on a surface of an object (e.g., an interior surface of a room or vehicle, an interior of a package, an exterior surface of a package, etc.) and activated using the one or more actuator(s). The processor in the device periodically polls the sensor(s) to acquire measurements therefrom associated with one or more ambient condition(s). The processor records in the memory such measurements and a timestamp of when each such measurement was acquired to create a log. In addition, the processor may evaluate such measurement to determine if the monitoring device has been subjected to an environmental condition or action that is above or below a particular limit defining, for example, an acceptable range. The processor may actuate the one or more light emitting device(s) to indicate the result of such evaluation. Further, as described in detail below, the one or more light emitting devices may be used to transmit data representing the log to another device.

Figure 1:
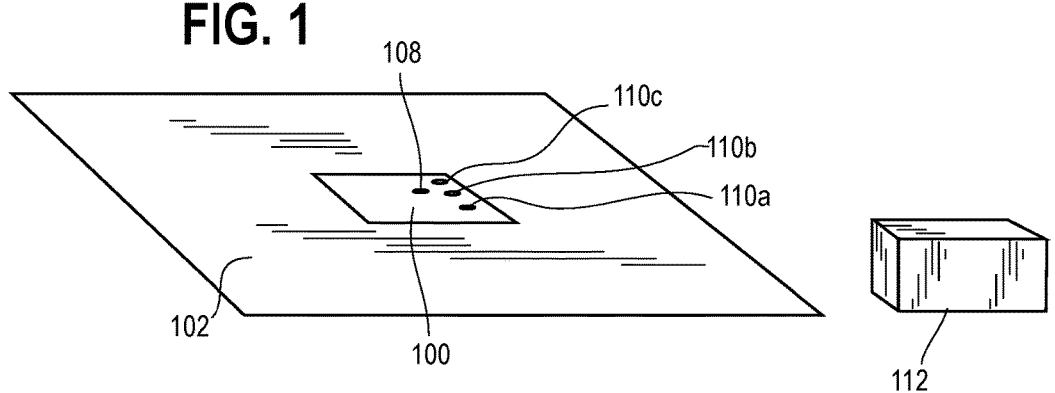
FIG. 1 is an isometric view of a monitoring device disposed on a surface and a receiving device.
Figure 2A:
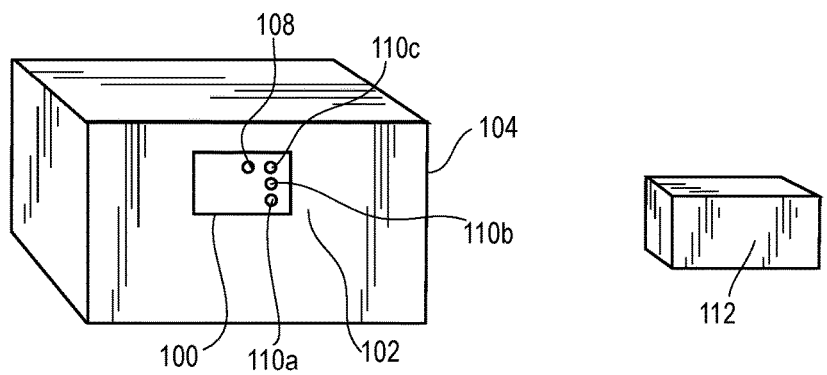
FIG. 2A is an isometric view of the monitoring device of FIG. 1 disposed on an external surface of a structure.
Figure 2B:
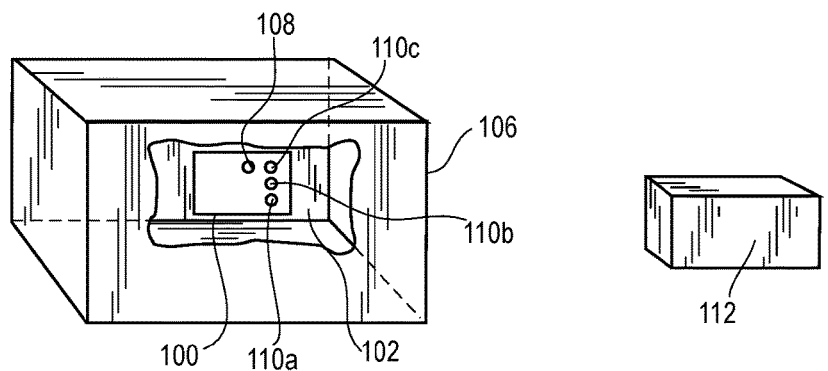
FIG. 2B is an isometric view of the monitoring device of FIG. 1 disposed on an internal surface of a structure.

More specifically, referring to FIGS. 1, 2A, and 2B, a monitoring device 100 is disposed on a surface 102. The monitoring device 100 may be temporarily placed on the surface 102 or the monitoring device 100 may be temporarily or permanently affixed to the surface 102. The surface 102 may be, for example, an outer surface 102 (FIG. 2A) of an object 104, an inner surface 102 (FIG. 2B) of an object 106, or any other portion thereof. It should be noted that the object 102 or 106 may be a vehicle, a package, a wall or other surface in a room or other environment, a finished or an unfinished good or goods, whether packaged or not, or any other article or articles. As described below, the monitoring device 100 may be configured to store data representing a log of exposure of the device 100, and therefore the surface 102, to one or more ambient influences or a lack of such exposure at one or more points in time in a memory of the device 102 or in another device (whether local or remote from the device 102). The ambient influence(s) may include an environmental condition, a force, disposition of the object 100 in one or more particular orientations, or any other influence that can be detected as noted in greater detail hereinafter.

The monitoring device 100 includes an actuator 108 that when actuated directs the processor to begin collecting data regarding the ambient influence(s) to which the monitoring device 100 is exposed (or not exposed), and record such data in the memory of the monitoring device 100. The monitoring device 100 also includes one or more indicator(s) 110 such as light emitting devices (LEDs) disclosed hereinafter that may be actuated by the processor to indicate whether the monitoring device 100, and therefore the surface 102, has been exposed to an ambient influence and, in some cases, the degree or amount of such influence.

In some embodiments, an operator may actuate the actuator 108 in a predetermined pattern to cause the processor to illuminate the one or more light emitting devices 110 in a sequence that represents the data recorded in the memory, and in this manner, transmit the recorded data to a receiving device 112. As described further below, the receiving device 112 interprets the sequence of illumination of the one or more light emitting devices 110 to reconstruct the transmitted data and stores such reconstructed data in a memory associated with the receiving device or another device, whether local or remote. In one embodiment, the receiving device 112 may be computer with a camera operating an application program operable to receive and interpret the transmitted data. Such a computer may include a desktop computer, a handheld tablet computer, a smartphone, and the like. Alternatively, as described below, the receiving device 112 may be a dedicated receiving device 112 operable to communicate with the monitoring device 100.

Figure 3:
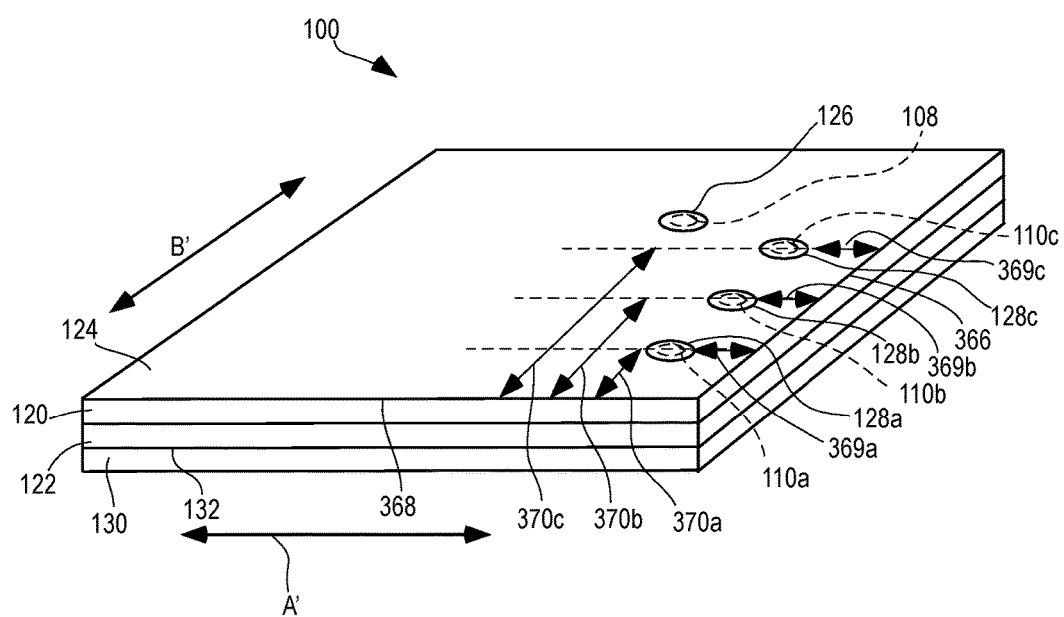
FIG. 3 is an isometric view of the monitoring device of FIG. 1.

Referring to FIG. 3, in one embodiment, the monitoring device 100 comprises a first substrate 120 and a second substrate 122 secured to one another. An outer surface 124 of the first substrate may be imprinted using conventional printing processes including lithography, intaglio, flexography, foil transfer, ink jet, xerography, and the like. Such imprinting may be used to print one or more of an advertisement, instructions, terms and conditions, and the like.

The actuator 108 may be manually actuated by the user from the outer surface 124 by, for example, pressing on a portion 126 of the outer surface 124 associated with the actuator 108.

The outer surface 124 also includes a region 128 associated with each light emitting device 110. In some embodiments, such region 126 comprises a transparent or translucent material through which at least a portion of the light emitted by the light emitting device 110 associated with the region 126 passes. In other embodiments, the region 126 comprises an orifice formed in the outer surface 124 to expose at least a portion of the light emitting device 110 associated with the region 126.

In some embodiments, a removable liner 130 may be affixed to an outer surface 132 of the second carrier.

The substrates 120 and 122, and the removable liner 130, may comprise coated or uncoated paper, textiles, woven materials, plastic, films, gels, epoxies, fiberglass, and combinations thereof. The substrates 120 and 122, and the removable liner 130, that comprise the monitoring device 102 may be manufacturing from identical or different materials.

Figure 4:
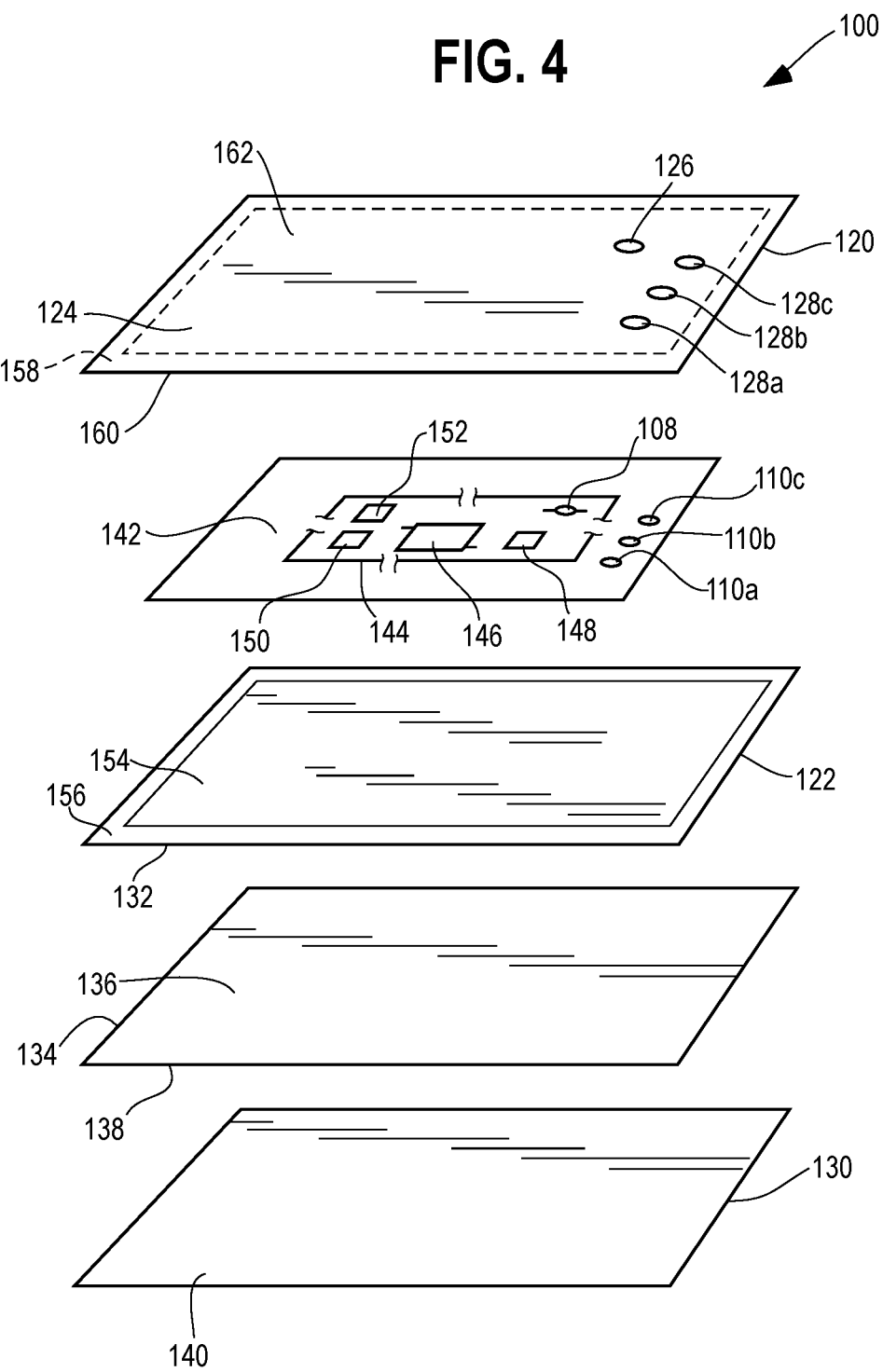
FIG. 4 is an exploded isometric view of the monitoring device of FIG. 1.

Referring to FIG. 4, when the removable liner 130 is in place, the removable liner 130 is affixed to the outer surface 132 of the second carrier 122 by an adhesive layer 134 disposed therebetween. The adhesive layer 134 comprises an inner surface 136 secured to the outer surface 132 of the second carrier 122 and an outer surface 138 secured to an inner surface 140 of the removable liner 130. In one embodiment, the adhesive layer 134 may be formed by applying an adhesive material to the outer surface 132 of the second carrier 122 and/or an inner surface 140 of the removable liner 130

The inner surface 140 of the removable liner 130 comprises a gloss finish so that such inner surface 136 may be separated from the outer surface 138 of the adhesive layer 134 without substantially removing or damaging the adhesive material that comprises the adhesive layer 134.

Removal of the removable liner 130 exposes the outer surface 138 of the adhesive layer 134, and such outer surface 138 may be used to secure the monitoring device 100 to the surface 102 (FIG. 1).

Disposed between the first substrate 120 and the second substrate 122 is a third substrate 142 having one or more circuit trace(s) 144 disposed thereon. The circuit trace(s) 144 interconnect components disposed on the circuit trace (144) and/or the third substrate 142. Such components include one or more actuator(s) 108, one or more light emitting device(s) 110, a processor 146, a memory 148 associated with the processor 146, one or more sensor(s) 150, and a battery or another power source 152.

In some embodiments, the circuit trace(s) 144 and the components 108, 110, 146, 148, 150, and 152 may be disposed directly on an inner surface 154 of the second substrate 122. In such embodiments, the third substrate 142 may not be necessary and may be omitted.

In a preferred embodiment, if the monitoring device includes the substrate 142, the first substrate 120 and the second substrate 122 are larger than the third substrate 142, so that a margin portion 156 of the inner surface 154 of the second surface can brought into contact and affixed to a corresponding margin portion 158 of an inner surface 160 of the first substrate 120. When the margin portions 158 and 160 are secured to one another in this manner, the third substrate 142 is substantially enclosed between the first substrate 120 and the third substrate 122. Additionally, the third substrate 142 may be adhesively or otherwise affixed to one or both of the inner substrate 154 of the second substrate 122 and the inner surface 160 of the first substrate 120 to prevent movement of the third substrate 142.

An additional protective covering (not shown) may be affixed to an outer surface 162 of the first substrate 120 to prevent damage of such outer surface 162 and any imprinting thereon during use.

As described above, the processor 146 may actuate the one or more light emitting devices 110 to transmit data stored in the memory 148. In one embodiment, the processor 146 operates one of the light emitting devices (e.g., 110a) to signal (or gate) that valid data is available on the remaining light emitting devices (e.g., 110b and 110c). The state of each remaining light emitting device 110b or 110c indicates a bit value associated with the data being transmitted. In some embodiments, turning on the data light emitting device 110b or 110c indicates a bit value of one and turning off such light emitting device 110b or 110c indicates a bit value of zero.

In one embodiment, the processor 146 transitions the signal light emitting device 110a from an on to an off state to indicate data are ready for transmission by the light emitting devices 110b and 110c. In such an embodiment, the maximum frequency at which the processor 146 transitions the signal light emitting device 110a from an on to an off state is preferably at most one-half of the frequency at which the reading device samples or senses the light emitting device 110a. If, for example, the reading device 112 includes a camera that captures images at a frame rate of 240 frames-per-second, the frequency at which the light emitting device 110a transitions from an on state to a subsequent off state is 120 cycles-per-second or less. Such an arrangement is adapted to the case in which the reading device 112 is capable of sensing only a single transition per frame. If, however, the reading device can sense more than one transition per frame, then a greater data transmission rate could be used as should be evident to one of ordinary skill in the art.

It should be apparent that if the reading device includes a camera, the reading device uses known image processing techniques to identify the light emitting device in images captured thereby. Such image processing technique(s) may include edge detection, color analysis, and the like. Further, the reading device may include information regarding the positions of the light emitting devices 110 relative to the edges of the monitoring device 100, and the positions of the light emitting devices 110 relative to one another.

Referring also to FIG. 5A, a sample timing diagram 200 illustrates how the processor may control the light emitting devices 110 to transmit information. The timing diagram 200 includes a horizontal time axis 202 that represents time and three graphs 204a, 204b, and 204c that indicate the on or off state of the light emitting devices 110a, 110b, and 110c relative to the time axis 202. Vertical dashed lines are displayed for each time $t_0, t_1, \ldots, t_{19}$ that indicate when the reading device senses the state of the light emitting devices 110a, 110b, and 110c.

In one embodiment in which a single transition of the light from the light emitting device 110a can be detected per frame, the receiving device 112 records data only when the receiving device 112 detects that the state of the signal light emitting device 110a has changed in consecutive image captures from an on state to an off state. The processor 146 sets the state of each light emitting device 110b and 110c in accordance with a bit value to be transmitted (i.e., two bits are to be transmitted simultaneously), then transitions the state of the light emitting device 110a from an on state to an off state. To ensure that the receiving device 112 detects the change from the on state to the off state of the light emitting device 110a, the processor 146 holds the light emitting device 110a in an on state for a duration at least equal to two capture cycles of the receiving device 112. Subsequently, the processor 146 holds the light emitting device 110a in an off state for at least two capture cycles of the receiving device 112. Also, during at least the time the light emitting device 110a is held in the off state and for at least two capture cycles of the receiving device 112, the light emitting devices 110b and 110c are maintained in states in accordance with bit values to be transmitted. Thus, the receiving device 112 will successfully capture data represented by the light emitting devices 110b and 110c at times $t_1, t_5, t_9, t_{14}, t_{18}$ and so on. The values shown in the box 205 are two-bit values transmitted at these times in accordance with the states of the light emitting devices 110b and 110c as shown in the graphs 204b and 204c, respectively. It should be apparent, that in alternative embodiments, the receiving device 112 may record the values indicated by the light emitting devices 110b and 110c when the receiving device 112 detects that the state of the light emitting device 110a in subsequent captures has changed from an off state to an on state.

In other embodiments, the receiving device 112 records the values indicated by the light emitting devices 110b and 110c when receiving device 112 detects any or every change in the state of the light emitting device 110a. In such embodiments, valid data are transmitted by light emitting devices 110b and 110c whenever the light emitting device 110a transitions either from an on state to an off state and/or from an off state to an on state.

FIG. 5B shows a timing diagram 206 that includes an axis 208 and three graphs 210a, 210b, and 210c to indicate the states of the light emitting devices 110a, 110b, and 110c. Vertical dashed lines are displayed for each time $t_0$, $t_1$, ..., and $t_{19}$ and indicate times when the reading device senses the state of the light emitting devices 110a, 110b, and 110c. The processor 146 sets the on or off state of the light emitting devices 110b and 110c in accordance with bit values to be transmitted, and changes the state of light emitting device 110a from on-to-off or off-to-on to indicate that the states of light emitting devices 110b and 110c are associated with valid data values to be transmitted. Thus, the receiving device 112 will successfully capture two-bits of data represented by the light emitting devices 110b and 110c at times $t_1$, $t_3$, $t_5$, $t_7$, $t_9$ and so on. The values shown in the box 212 indicate the transmitted bits at these times in accordance with the states of the light emitting devices 110b and 110c as shown in the graphs 210b and 210c, respectively.

In still another embodiment, the processor 146 transmits the data in bursts of a predetermined number of bits at a predetermined frequency. In such embodiments, each burst is preceded by a training period during which at least one of the light emitting device 110 is modulated between an on state and an off state at the predetermined frequency for a predetermined number of cycles. The receiving device 112 samples the state of the modulated light emitting device 110 at a frequency higher than the frequency at which the light emitting device 110 is modulate. The receiving device 112 analyzes such samples using conventional techniques to estimate a frequency and a phase at which the light emitting device 100 is being modulated, and synchronizes the sampling frequency and phase thereof with that of the light emitting device 100. Thereafter the receiving device 112 samples all of the light emitting devices 110 at the estimated sampling frequency. Using this technique eliminates the need for having one of the light emitting devices 110a provide a gating or clock signal as described above, and the such light emitting device 110a may be used to transmit an additional bit of data per cycle. To prevent desynchronization, the data is sent in bursts as described above with a gap of no data transmission between bursts. It should be apparent to those who have skill in the art that when this transmission method is used, the sampling frequency of the receiving device 112 should be greater than the frequency at which the light emitting devices 110 are modulated. In one embodiment, processor 146 transmits the data in bursts of approximately 16 bytes, if the receiving device 112 uses a camera to receive the data, for example, if the receiving device 112 is smartphone. It should be apparent that the number of bytes in a burst may be selected in accordance with the capabilities of the receiving device 112 or any other criterion.

Figure 6:
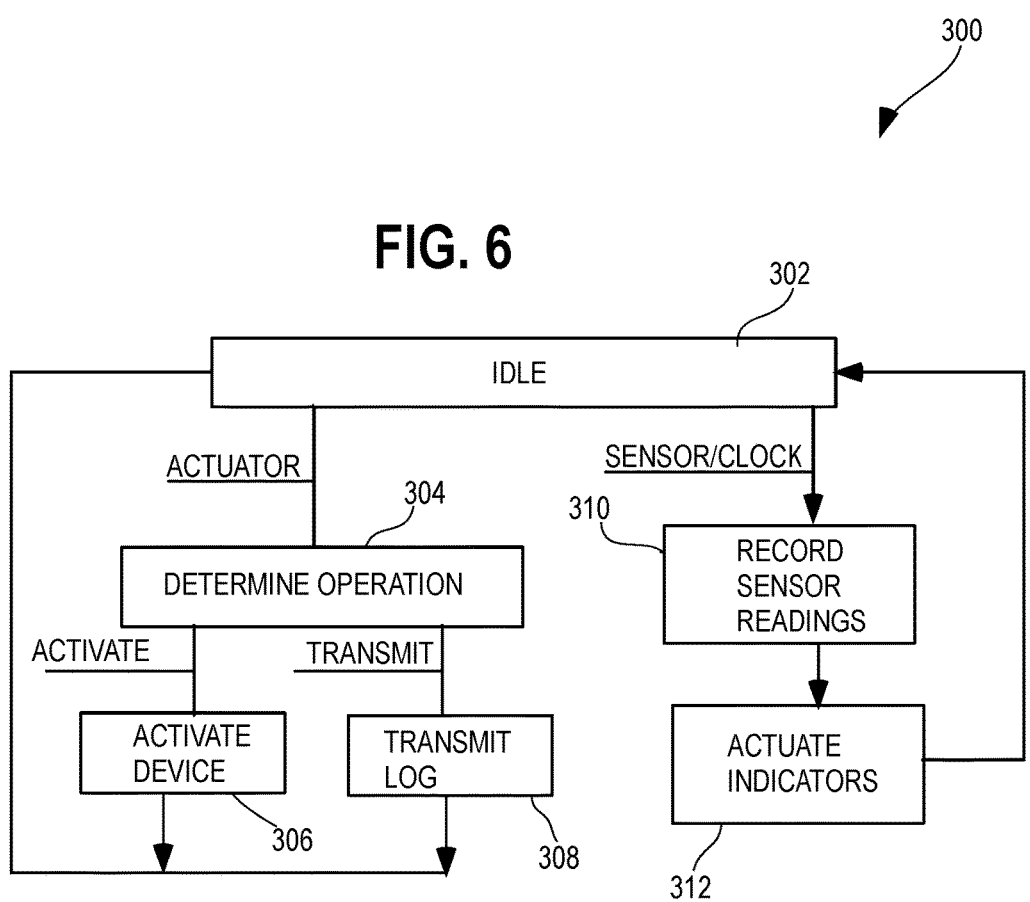
FIG. 6 is a state diagram of operating states of the monitoring device of FIG. 1.

FIG. 6 is a state diagram 300 that illustrates operation of the processor 146 of the monitoring device 100 according to one embodiment. Referring to FIGS. 3 and 6, the processor 146 initially operates in a low-power idle state 302. If the actuator 108 is actuated, for example, by the user depressing the actuator 108, the processor 146 transitions into a determine operation state 304. In the determine operation state 304, the processor 146 determines if the actuation was associated with predetermined actuation types such as a single actuation of less than a first predetermined amount of time, a single actuation that lasted at least as long as the predetermined amount of time, at least a predetermined number of actuations within a second predetermined amount of time, and the like. As described below, the processor 146 may be configured to undertake different operations in response to different types of actuations.

If the type of actuation determined in the determine operation station 304 is associated with an activation or initialization of the monitoring device 100, the processor 146 operates in the activate device state 306. In the activate device state 306, the processor 146 reads configuration information stored in the memory 148 and configures the sensor(s) 150 in accordance with such information. For each sensor 150, the configuration information may specify, for example, whether the sensor should generate an interrupt when a magnitude of an environmental condition monitored by the sensor is exceeded, and the configuration information may be supplied with any initialization signals that need to be provided to the sensor 150 to begin operation thereof, and the like.

The configuration information stored in the memory 148 that is used to configure the sensor(s) 150 may be stored in such memory 148 when the monitoring device 100 is manufactured or may be communicated to the monitoring device 100 using light-based communications as described below, or an additional configuration circuit (not shown). Such configuration circuit may include one or more additional actuator(s), a Radio Frequency Communication module and an antenna, a serial port, and the like.

When operating in the activate device state 306, the processor 146 may also initialize other components of the monitoring device 100. The processor 146 returns to the idle state 302 after the components have been initialized.

If the type of actuation determined in the determine actuation state 304 is associated with a transmit operation, the processor 146 transitions to a transmit log state 308. In the transmit log state 308, the processor 146 operates the light emitting devices 110 to transmit a log stored in the memory 148, as described herein. After transmission of the log is completed, the processor 146 returns to the idle state 302.

When in the idle state 302, if the processor 146 receives a clock interrupt and/or an interrupt generated by the sensor 150, the processor 146 transitions to a read sensor state 310. In the read sensor state 310, the processor 146 obtains a reading of the sensed condition, for example, one or more environmental condition(s) sensed by the sensor(s) 150, and records such condition(s) and an optional timestamp in the memory 148. In some embodiments, when in the state 310, the processor may record the environmental condition(s) in the memory 148 only if magnitude of such condition(s) exceed a preset threshold magnitude(s) associated with such condition(s).

Thereafter, the processor 146 transitions to an actuate indicator state 312 and actuates the light emitting devices 110 in accordance with the environmental condition(s) sensed by the sensor(s) 150. Note, that the actuations of the light emitting devices 110 are to provide an indication to an observer of the monitoring device regarding environmental condition(s) sensed by the sensor(s). Even though the same light emitting devices 110 are actuated, these actuations are for a different purpose than transmitting data using light-based communications described above. For example, the processor 146 may turn on only the light emitting device 110a if the magnitude of the sensed condition is less than a first predetermined magnitude, only the light emitting device 110b if the magnitude of the sensed condition is between the first predetermined magnitude and a second predetermined magnitude, and the light emitting device 110c if the magnitude of the sensed condition is greater than the second predetermined magnitude. In some embodiments, when in the state 312, after turning on one or more light emitting devices 110, the processor 146 waits a predetermined amount of time, and then turns off the one or more light emitting devices 110. Thereafter, the processor 146 transitions to the idle state 302.

FIG. 7 shows a flowchart of the steps undertaken by the processor when in the transmit log state 308. Referring to FIGS. 3 and 7, when in the transmit log state 308, at a block 320, the processor 146 checks to see if any data remains to be transmitted. If there is no data remaining, the processor 146 exits (and transitions to a state 302).

Otherwise, at a block 322, the processor 146 sets the state of the signal light emitting device (e.g., light emitting device 110a) to on. At a block 324, the processor 146 waits for a predetermined amount of time, for example, enough time for the receiver 112 to undertake two capture cycles.

Thereafter, at a block 326, the processor 146 selects bits to transmit. In particular, the processor 146 selects a number of bits identical to the number of light emitting device light emitting devices 110 available to transmit data values. In the monitoring device 100, the number of light emitting devices 110 available to transmit data values is two (light emitting devices 110b and 110c), and hence, in such embodiment, the processor 146 selects two bits.

At a block 328, the processor 146 sets the states of the light emitting devices 110 that are used to transmit data values in accordance with the values of the bits selected.

At a block 330, the processor 146 sets the state of the signal light emitting device (e.g., light emitting device 110a) to an off state to indicate that valid data is indicated by light emitting devices 110b and 110c. Then, at a block 328, the processor waits a predetermined amount of time equal to at least two capture cycles of the receiving device 112. Thereafter, the processor 146 returns to the block 320 to determine if any additional data bits remain to be transferred. The processor 146 undertakes the actions of the blocks 320-332 until all of the data in the memory 148 to be communicated to the receiving device 112 have been transmitted. After all of the data has been communicated, the processor 146, at a block 334, actuates the light emitting devices with a predetermined pattern of pulses or data to indicate that transmission is completed.

Figure 8A:
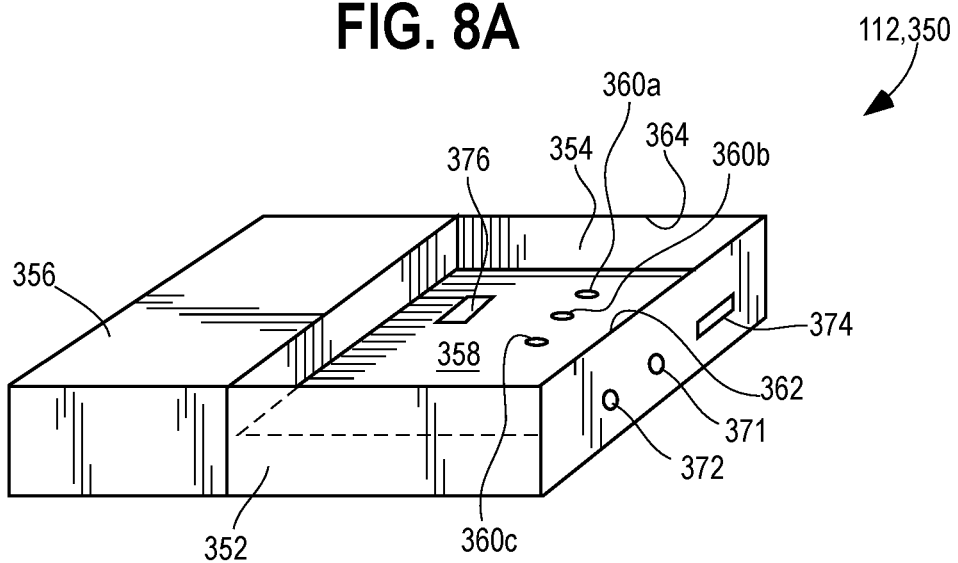
FIG. 8A is an isometric view of an embodiment of the receiving device of FIG. 1.
Figure 8B:
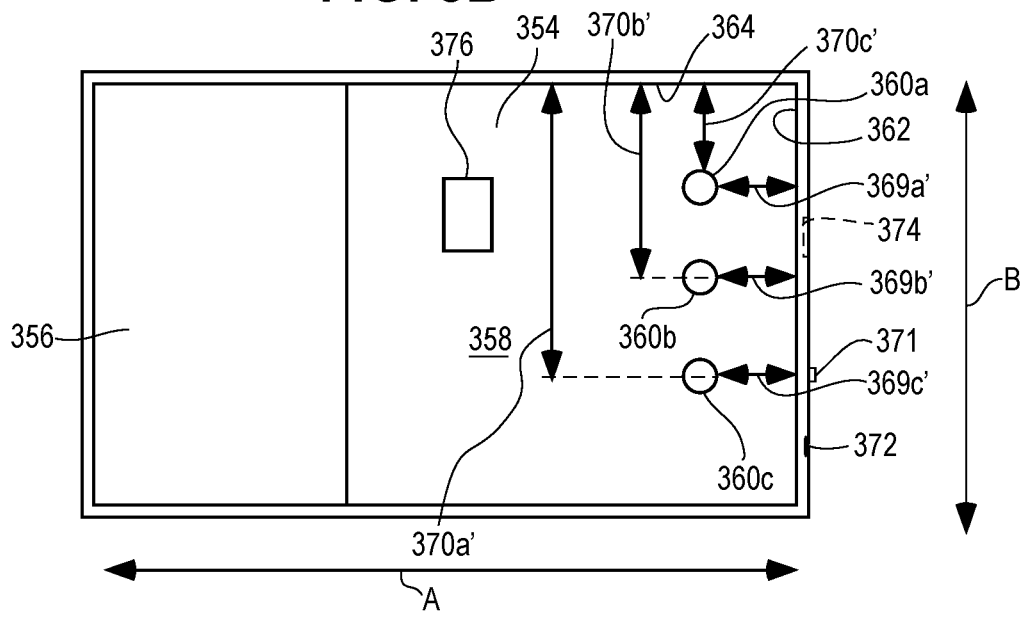
FIG. 8B is a plan view of the receiving device of FIG. 8A.

In some embodiments, the receiving device 112 may be a dedicated device that operates with the monitoring device 100. Referring to FIGS. 3, 8A, and 8B, one embodiment 350 of the receiving device 112 includes a housing 352. The housing 352 includes a recessed portion 354 and a compartment 356. Disposed on a bottom surface 358 of the recessed portion 354 are a plurality of light sensors 360.

The recessed portion 354 includes a first interior edge 362 and a second interior edge 364 and the monitoring device 100 includes edges 366 and 368 (see FIG. 3). The light sensors 360 are disposed in the receiving device 112 such that a distance 369a, 369b, and 369c, when measured along a direction A, from the first interior edge 362 to each light sensor 360a, 360b, and 360c, respectively, is substantially identical to a distance 369a', 369b', and 369c', when measured along a direction A', from the edge 366 to each light emitting device 110a, 110b, and 110c, respectively. Similarly, a distance 370a, 370b, and 370c, when measured along a direction B, of each light sensor 360a, 360b, and 360c, respectively, from the second interior edge 364 is substantially identical to a distance 370a', 370b', and 370c', measured along a direction B', of each light emitting device 110a, 110b, 110c from the edge 368 of the monitoring device 100. This arrangement of the light sensors 360 facilitates alignment of each light sensor 360a, 360b, and 360c with the corresponding light emitting device 110a, 110b, and 110c, respectively, when the edges 362 and 364 of the receiving device are abutted against the edges 366 and 368, respectively, of the monitoring device 100.

The receiving device 350 also includes an actuator (e.g., a switch) 371, an light emitting device 372, and a communications port 374. During operation, the processor 146 (FIG. 4) of the monitoring device 100 is placed into the transmit log state 308 (FIG. 6) as described above, and the receiving device 350 is positioned relative to the monitoring device 100 so that the light sensors 360 are aligned with the light emitting devices 110 as described above. Thereafter, the actuator 371 is actuated. It should be apparent, that the processor 146 may wait a period of time after entering the transmit log state 308 and before initiating transmission to allow the receiving device 350 to be positioned over the monitoring device 100.

A processor 376 of the receiving device 350 is coupled to the light sensors 360a, 360b, and 360c and captures light signals emitted by the light emitting devices 110, as described above and sensed by the light sensors 360, and decodes such signals into a data stream. The processor 376 may store such data stream in a memory associated therewith or transmit the data stream through the communications port 374. Such data stream may be transmitted to another computer or device using any communication means apparent to one of ordinary skill in the art including USB, RS-232, Ethernet, or a wireless means such as Bluetooth, 802.11, and the like. As the data stream is received, the processor 376 may illuminate the light emitting device 372 to indicate successful receipt of the transmitted data.

The compartment 354 of the housing 352 may be used to hold a battery or another energy source (not shown) that supplies power to the various components of the receiving device 350, and may further hold accessories (not shown), e.g., a communications cable, that may be used with the receiving device 356. Further, structure(s) disposed in the compartment 354 may support the monitoring device 100 when such device is placed on top of the receiving device 350.

In some embodiments, both the monitoring device and the receiving device include both one or more light emitting device(s) and one or more light sensor(s). In such embodiments, the monitoring device and the receiving device are able to both transmit data to each other and receive data from each other. In such embodiments, light emitting device may not have to provide the signal that indicates that data is available at the other light emitting devices, and also to allow the receiving device 112 to download data, e.g. configuration information, to the monitoring device 100.

Figure 9:
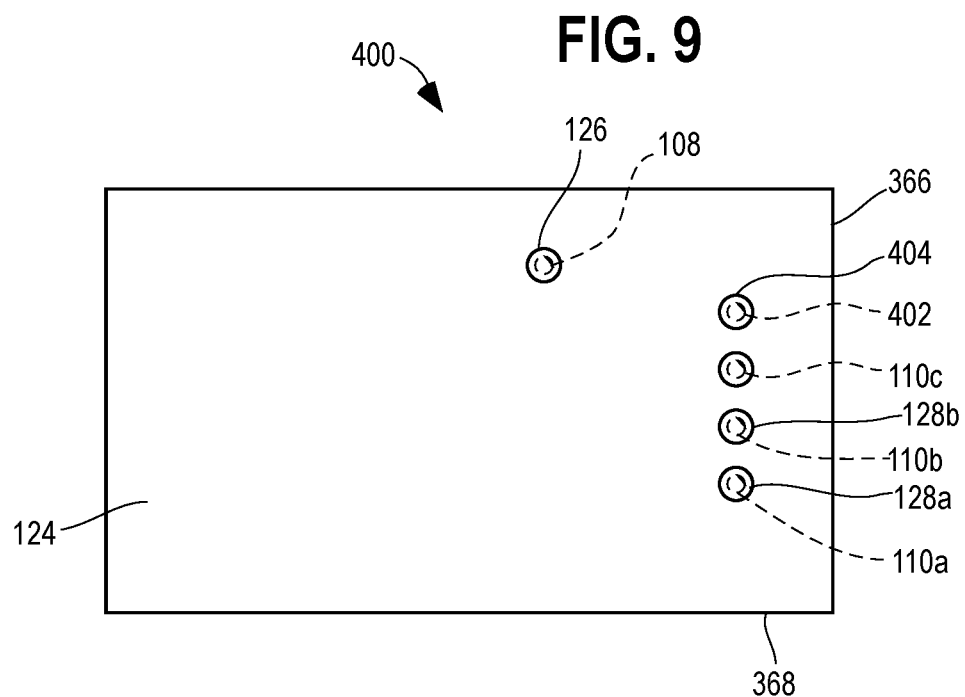
FIG. 9 is a plan view of an embodiment of the monitoring device of FIG. 1.

Referring to FIG. 9, a monitoring device 400 is substantially identical to the monitoring device 100 described above, except the monitoring device 400 further includes a light sensor 402. The top surface 124 of the monitoring device 400 includes a portion 404 that allows at least a portion of light directed at the portion 404 to be transmitted to and sensed by the light sensor 402.

Figure 10:
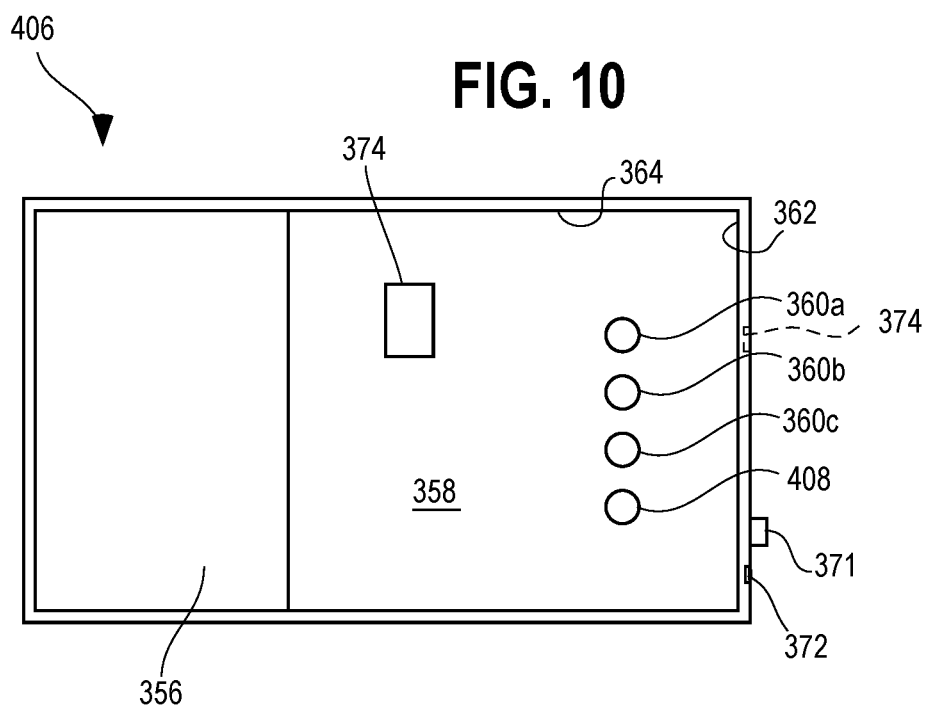
FIG. 10 is a plan view of another embodiment of the receiving device of FIG. 1.

Referring to FIG. 10, a receiving device 406 is substantially identical to the receiving device 350 described above, except the receiving device 406 further includes a light emitting device 408 disposed on the bottom surface 358.

Referring to both FIGS. 9 and 10, the light sensor 402 of the monitoring device 400 is positioned with respect to the edges 366 and 368, and the light emitting device 408 of the receiving device 406 is positioned with respect to the edges 362 and 364, such that when the edge 362 is abutted with the 366 and the edge 364 is abutted with the edge 368, the light sensor 402 and the light emitting device 408 are aligned with one another and at least a portion of light transmitted by the light emitting device 408 is sensed by the light sensor 402.

During operation, in one embodiment, the actuator 108 of the monitoring device 400 is actuated, then the receiving device 406 is positioned over the monitoring device 400 so that the light sensors 360 and the light emitting device 408 are aligned with the light emitting devices 110 and the light sensor 404, respectively. The actuator 371 of the receiving device is then actuated to initiate two-way communications between the monitoring device 400 and the receiving device 406.

Figure 11:
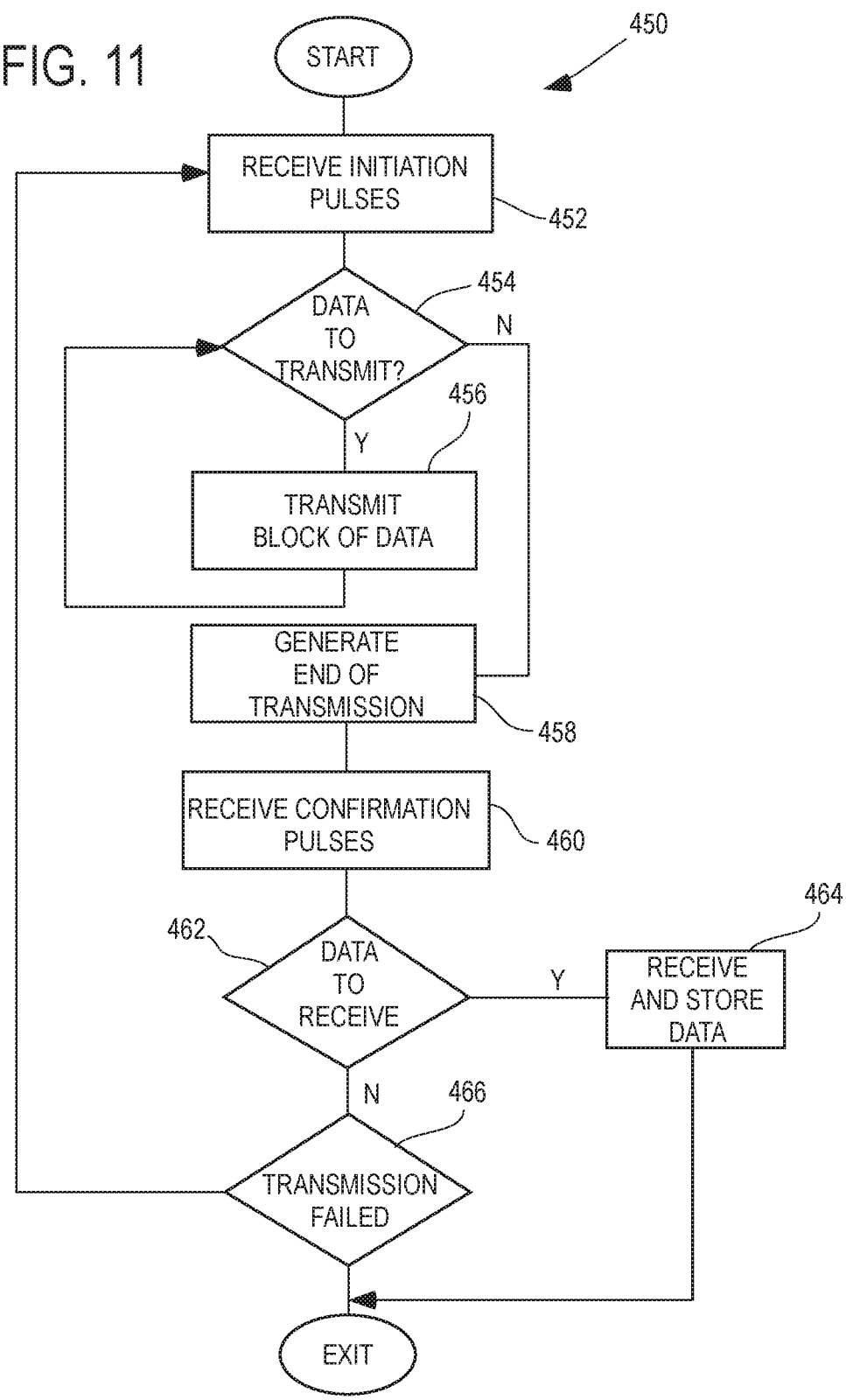
FIG. 11 is a flowchart of processing undertaken by a processor of the monitoring device of FIG. 9 to transmit data.

FIG. 11 is a flowchart 450 of the processing undertaken by the processor 146 of the monitoring device 400 in response to the actuation of the actuator 108. After the actuator 108 is actuated, the processor 146 of the monitoring device 400 waits at a block 452 to receive via the light sensor 408 a predefined sequence of one or more light pulses generated by the light emitting device 408 of the receiving device. Such one or more light pulses may simply be a single pulse of predetermined duration, a sequence of a predetermined number of pulses of identical duration, or a sequence of a predetermined number of pulses wherein each pulse is of a predetermined duration that may be the same or different than the duration of other pulses.

After the predefined sequence of pulses is received, at a block 454, the processor 146 determines if there is any data remaining in the memory 148 to transmit. If there is, the processor proceeds to a block 456, otherwise, the processor proceeds to a block 458.

At the block 456, the processor 146 transmits a predetermined number of bits of data using the light emitting devices 110 of the monitoring device 400. In some embodiments, as described above, the processor 146 sets the state of the light emitting devices 110b and 110c in accordance with two bits of data to transmit and the state of the light emitting device 110a to signal that states of the light emitting devices 110b and 110c represent valid data.

In other embodiments, the processor 146 uses all of the light emitting devices 110 to transmit data by setting the state of each of the light emitting devices 110 in accordance with a bit to be transmitted for a predetermined amount of time. In still other embodiments, the processor 146 sets the state of all of the light emitting devices 110 in accordance with bits to be transmitted, then waits until a light pulse is detected by the light sensor 404. In such embodiments, the processor 376 of the receiving device 406 actuates the light emitting device 408 each time data are received using the light sensors 360.

In some embodiments, the receiving device 400 may transmit, in addition to the predefined sequence pulses, the number of bytes to transmit in a burst or a packet. In other embodiments, such packet size is predefined. In some of these embodiments, the monitoring device 400 transmits a number of bytes that is specified by the packet size (or fewer bytes if there are not sufficient data to transmit), then waits for acknowledgement of receipt of the packet from the receiving device 400 before transmitting another packet of data. Such acknowledgement of receipt may be one or more predefined pulses of the light emitting device 408 actuated by the processor 376 of the receiving device 400. In some embodiments, the computer or device to which the receiving device 400 transmits the data via the communications port 374, or other means of communications, specifies (e.g., via a transmission to the receiving device 400) the maximum number of bytes each packet should contain. In some embodiments, each packet size is 1 kilobytes of unencoded (raw) data. In other embodiments, the packet size if 2 kilobytes of ASCII encoded data.

In some embodiments, the processor 146 may send a predefined sequence of bits to indicate the start of a block of data, then send the block of data, and then send another predefined sequence of bits to indicate that the block of data has been sent. It should be apparent that the block of data transmitted may include error checking and correction data that the receiving device 112 may use to validate the integrity of the data received and decoded thereby.

After the block of the data has been transmitted at the block 456, the processor returns to the block 454 to determine if any additional data is to be transmitted.

After all of the data has been transmitted, the processor 146, at a block 458 operates the light emitting devices 110 to generate a predefined sequence of pulses that indicate to the receiving device 406 that all of the data has been transmitted.

Thereafter, at a block 460, the processor 146 waits until a predefined sequence of pulses is transmitted by the receiving device 406 and is sensed by the light sensor 402. The predefined sequence of pulses may be selected from a plurality of predefined sequences and may indicate that the transmitted data was successfully received and that the receiving device 406 does not have any further data to transmit to the monitoring device 400, or that the transmitted data was successfully received and that the receiving device 406 has data to transmit to the monitoring device 400, or that there was an error in communications.

Thereafter, at a block 462, the processor 146 determines whether the predefined sequence of pulses indicates that the receiving device 406 has data to transmit to the monitoring device 400. If so, the processor 146, at a block 464 receives the data via the light sensor 402, and then exits. The processor 376 of the receiving device 406 undertakes processing similar to that described in connection with the blocks 452-458 to transmit data, except such data is transmitted one bit at a time and without use of a signal light emitting device. Data transmitted by the receiving device 406 may include for example, program code and/or configuration parameters to be stored in particular locations in the memory 148 of the monitoring device 400. Such data may also include a command to, for example, restart the monitoring device 400 or reload configuration parameters from the memory 148, or to reset the sensor(s) 150 of the monitoring device 400.

If, at the block 462, the processor 146 determines that the predefined sequence of pulses received at the block 460 do not indicate that the receiving device 406 has data to transmit, the processor 146 proceeds to a block 466.

At the block 466, the processor determines if the predefined sequence of pulses indicates an error in the receipt of data by the receiving device 406, and if so, proceeds to the block 452 to retransmit the data. Otherwise, the processor 146 exits.

Figure 12:
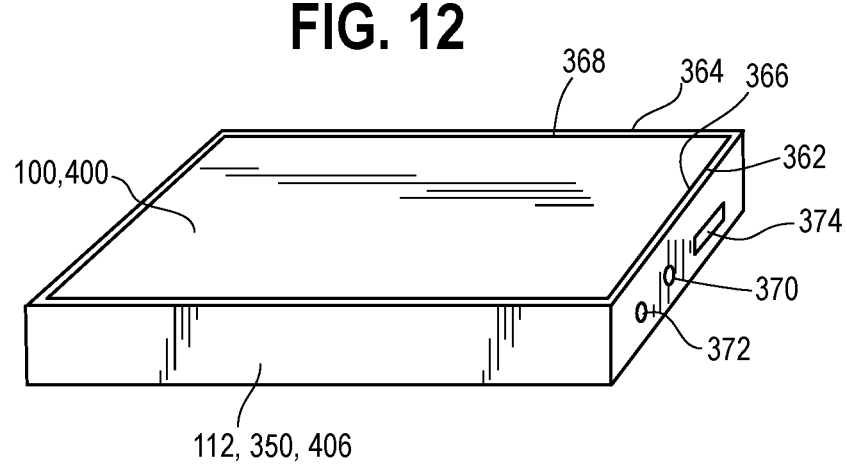
FIG. 12 is an isometric view of the monitoring device of FIG. 1 disposed on top of the receiving device of FIG. 1.
Figure 13:
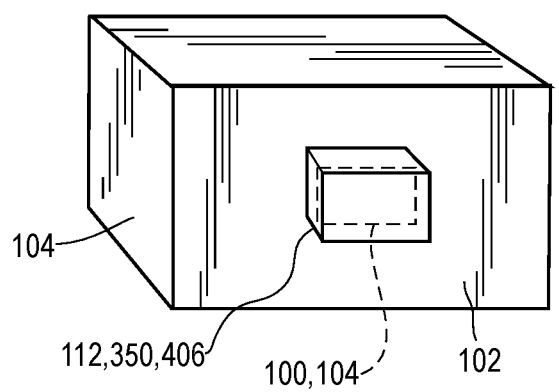
FIG. 13 is an isometric view of the monitoring device of FIG. 1 disposed on an object, and the receiving device of FIG. 1 positioned over the monitoring device.

Referring to FIG. 12, in some embodiments, the dimensions of the receiving device 112, 350, 406 are selected so that the monitoring device 100, 400 may be placed thereon for communications therebetween. In other embodiments, the receiving device 112, 350, 406 is contemplated to be a portable device that may be used to receive data from the monitoring device 100, 400, even when such monitoring device is affixed to an object. Referring to FIG. 13, the monitoring device 100, 400 may be affixed to the surface 102 of the object 104, as described in connection with FIG. 2. The receiving device 112, 350, 406 may be placed over such monitoring device 100, 400 to receive data therefrom as described above without having to first remove the monitoring device 100, 400 from the surface 102. The receiving device 112, 350, 406 may include a lanyard or other carrying device (not shown) to enable a user to securely hold the receiving device 112, 350, 406 when used in this manner.

Although, the embodiments of the monitoring device 100, 400 and the receiving device 112, 350, 406 described above use binary light emitting devices 110, 408, that are operated in an on state or an off state, it should be apparent that one or more of these binary light emitting devices 110, 408 may be replaced with light emitting device(s) that are operated in multiple discrete levels of intensity. For example, operating such light emitting device(s) in four states (e.g., 0%, 25%, 50%, and 100% intensity) would allow transmission of two bits of data with each such light emitting device. Further, it should be apparent that light emitting devices may be used that produce different hues and intensities of light, and that discrete combinations of a selected hue and a selected intensity represent different data values, thereby further increasing number of bits that may be transmitted by an individual light emitting device at a particular time.

It should be apparent that the data that is transmitted by the monitoring device 100, 400 may be compressed and/or encoded using various techniques known to those who have skill in the art. Such techniques may include Huffman encoding, LZW, and tar, and the like. Further, although the present disclosure notes that light-based communication may be used to transmit digital data using the light emitting device 110, it should be apparent that other types of data can be encoded and transmitted using other data encoding and/or transmission techniques.

INDUSTRIAL APPLICABILITY

It should be apparent that the various aspects of the monitoring devices 100 and 400 may be combined to receive and/or transmit data therebetween using light-based communications. Further the various combinations of the receiving device 112, 350, and 406 may be combined to receive data using light-based communications.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A monitoring device, comprising:
    a first substrate adapted to be secured to a structure;
    a second substrate;
    a third substrate disposed between the first and the second substrates; and
    an electronic circuit affixed to the third substrate, wherein the electronic circuit comprises a first light emitting device, a second light emitting device, and a processor, and the first and second light emitting devices are positioned such that light emitted thereby is directed outwardly through the second substrate,
    wherein the processor is adapted to select a plurality binary values to transmit, to operate the first light emitting device in one of an on state and an off state in accordance with each binary value, and to transition the second light emitting device between an on state and an off state to indicate that the state of the first light emitting device represents one of the plurality of binary values.

2. The monitoring device of claim 1, further including means for securing the first and the second substrate to one another.

3. The monitoring device of claim 1, wherein the first, second and third substrates include first, second, and third perimeters, respectively, and the third perimeter does not extend beyond the first and the second perimeters.

4. The monitoring device of claim 3, wherein the third substrate is enclosed between the first and the second substrates.

5. The monitoring device of claim 1, further including a removable liner, wherein the first substrate includes an adhesive disposed on an outer surface thereof, the removable liner is secured to the adhesive, and removal of the liner enables the monitoring device to be attached to the structure.

6. The monitoring device of claim 1, wherein the electronic circuit is affixed to only one surface of the third substrate.

7. The monitoring device of claim 1, wherein the second substrate includes an orifice aligned with one of the first light emitting device and the second light emitting device such that light emitted by the one of the first light emitting device and the second light emitting device passes through the orifice.

8. The monitoring device of claim 1, wherein the electronic circuit includes a conductive trace, and the conductive trace is imprinted on the third substrate.

9. The monitoring device of claim 1, wherein the second substrate includes indicia printed on an outer surface thereof.

10. The monitoring device of claim 1, wherein the electronic circuit includes a sensor adapted to generate a signal in response to where the sensor is disposed, and the processor selects the binary value in response to the signal.

11. The monitoring device of claim 10, wherein the processor selects the plurality of binary values in accordance with signal.

12. The monitoring device of claim 1, in combination with a receiving device, wherein the processor synchronizes the operation of at least the first light emitting device and the second light emitting device with operation the receiving device.

13. The monitoring device and receiving device of claim 12, wherein the electronic circuit includes a sensor disposed on the electronic circuit, the receiving device is adapted to generate a signal, and the processor synchronizes operation of the at least the first light emitting device and the second light emitting device in accordance with detection of the signal by the sensor.

14. The monitoring device and receiving device of claim 13, wherein the sensor is a photo sensor, and the signal generated by the receiving device includes an emission of light.

15. The monitoring device and receiving device of claim 12, wherein the receiving device includes a light-sensor operating at a predetermined frame rate and a frequency of transitions of the second light emitting device is in accordance with the predetermined frame rate.

16. The monitoring device and receiving device of claim 15, wherein the receiving device is a smartphone having a digital camera, and the digital camera includes the light-sensor.

17. The monitoring device and receiving device of claim 12, wherein the first light emitting device and the second light emitting device are spatially separated on the electronic circuit, and the receiving device includes spatially separated first and second sensors such that when the first light emitting device and the first sensor are aligned, the second light emitting device and the second sensor are aligned.

18. A method of operating a monitoring device that includes an electronic circuit affixed to a substrate, wherein the electronic circuit comprises a first light emitting device, a second light emitting device, and a processor, comprising:
    selecting a plurality of binary values to transmit;
    operating the first light emitting device in one of an on state and an off state in accordance with each binary value; and
    transitioning the second light emitting device between an on state and an off state to indicate that the state of the first light emitting device represents one of the plurality of binary values.

19. The method of claim 18, further including securing the substrate to another substrate.

20. The method of claim 18, wherein the substrate comprises a first substrate and the monitoring device comprises second and third substrates, further including enclosing the first substrate between the second and third substrates.

21. The method of claim 18, wherein the monitoring device includes an adhesive disposed on an outer surface thereof and a removable liner secured to the adhesive, further including removing the removable liner to enable the monitoring device to be attached to a structure.

22. The method of claim 18, further including aligning at least one of the first light emitting device and the second light emitting device with an orifice disposed on external surface of the monitoring device such that light emitted by the at least one of the first light emitting device and the second light emitting device passes through the orifice.

23. The method of claim 18, further including synchronizing operation of the first and/or the second light emitting device(s) with operation a receiving device.

24. The method of claim 23, wherein the monitoring device includes a sensor, further including detecting a signal by the sensor, and operating the first and/or second light emitting device(s) in accordance with detection of the signal.

25. The method of claim 24, wherein the sensor is a photo sensor and the signal includes an emission of light.

26. The method of claim 25, wherein transitioning the second light emitting devices includes the step of transitioning the second light emitting device between an on state and an off state in accordance with a predetermined frequency.

* * * * *